June 5, 1934.   W. F. HUGHES   1,961,930
CUSHION CLUTCH PLATE
Filed May 18, 1932
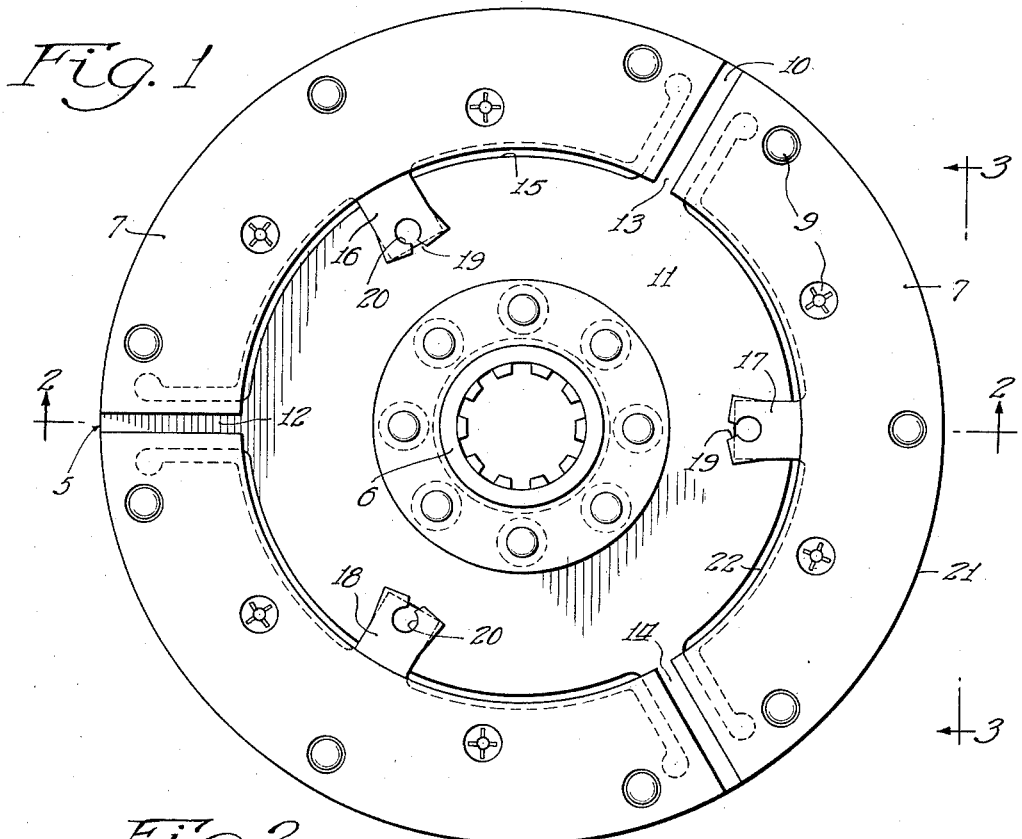
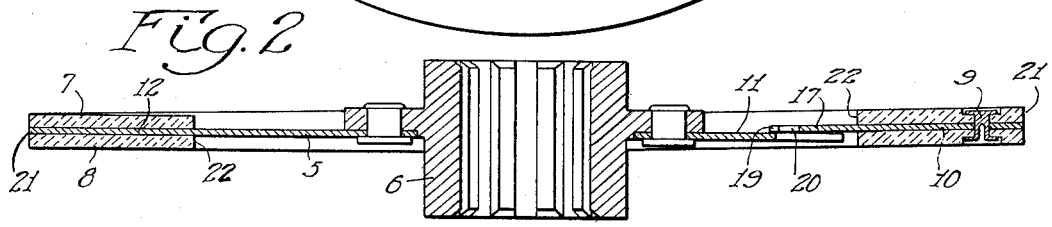
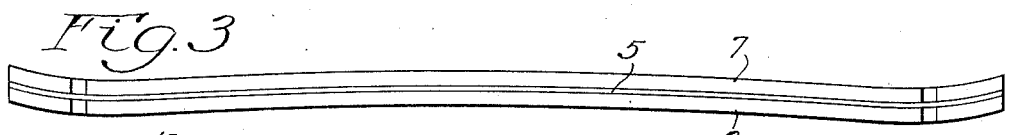
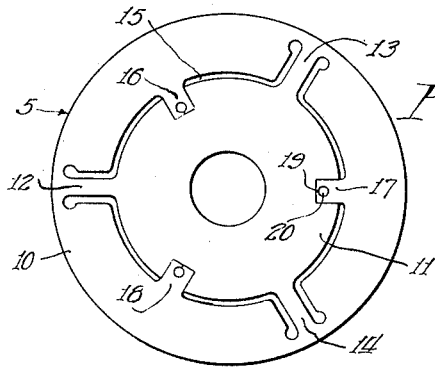
Inventor
William F. Hughes
By Patented June 5, 1934

1,961,930

UNITED STATES PATENT OFFICE 1,961,930

CUSHION CLUTCH PLATE

William F. Hughes, Chicago, Ill., assignor to Perfection Gear Co., Chicago, Ill., a corporation of Illinois Application May 18, 1932, Serial No. 611,997

10 Claims. (Cl. 192—107)

My invention relates to friction clutches of the kind where the friction plate is interposed between two parts of a driving member and is adapted to be gripped by the parts under sufficient pressure to impart movement from the driving member to the driven member of the clutch.

One object of the invention is to produce a novel clutch plate having friction rings which while they are fully backed up by the metal of the plate member yieldingly engage the driving member without grabbing or jerking.

Another object of the invention is to produce a clutch plate capable of yielding when pressure is applied thereto until full driving engagement is obtained with the driving member which plate requires no offsets or bends to be formed therein in the making.

It is also an object of this invention to provide a plate structure of simple unitary construction which is easily formed and which when formed provides a twisted rim portion as a backing for the friction rings applied thereto.

I will describe the preferred form of my invention by reference to the accompanying drawing wherein—

Fig. 1 is a plan view of the clutch plate;

Fig. 2 is a section on the line 2—2 of Fig. 1;

Fig. 3 is an edge view taken substantially in the direction indicated by the numerals 3—3; and Fig. 4 has a reduced detail of the clutch plate as it appears before attachment to the hub and before the friction rings are mounted thereon.

Referring now in detail to the drawing, the clutch comprises a disc 5 mounted on a hub 6 and having the friction rings 7 and 8 secured against the opposite sides thereof by the rivets 9 or other suitable securing means. The friction rings preferably are segmental, as shown, each ring being divided into three sections. The disc itself consists of an outer portion 10 and an inner portion 11 connected together by means of the portions 12, 13, and 14, the disc being cut away in the spaces indicated at 15. In forming the disc, the openings 15 are punched out and at the same time the portions 16, 17, and 18 are cut loose from the inner section of the disc and left attached to the outer section. These portions are preferably also slit at the end as indicated at 19 and provided with openings such as 20.

Now when the friction rings are applied and riveted into place and the discs secured to the hub, it makes the clutch plate a plain flat plate with the entire rim lying in one plane. The friction rings, it will be noted, are substantially completely backed up by the metal of the plate 5 so that there is no tendency for these rings to crack as they tend to do where they are supported at spaced points rather than entirely over the surface thereof.

In order to change the plate into a yielding plate structure, I force the portions 16, 17, and 18 to one side of the central portion 11 and spread their inner ends, as shown clearly in Figs. 1 and 2, so that they lie alongside the inner section 11. This may be done either before or after assembly of the rings with the plate, but preferably the friction elements are put on last. This distorts the rim of the plate together with its friction rings into a twisted form, that is to say, the rim portion directly outside of the portion 17 tips as shown in Fig. 2 so that the outer edge at 21 is farther away from the plane of the central portion 11 than the inner edge 22 is. At the connecting portions such as 12, 13, and 14, the inner edge 22 is, of course, secured direct to the section 11, but the outer edge is distorted slightly out of line on the same side that the members such as 16, 17, and 18 are pushed out on. This distortion, however, is considerably less than the amount the outer edge 21 is offset opposite the members 16, 17, and 18. The result is a twisted rim portion so that when pressure is applied to both sides of the plate, the plate yields with a rolling motion from the inside to the outside against one drive member and from the outside to the inside against the other drive member. The ring bearing portion actually takes a cone shape with the hub as the center. This makes a very smooth action in the engagement of the clutch with the drive members and has the additional advantages that, as the pressure is applied, the clutch plate rim is straightened out into a plane surface as it was originally formed. The friction rings are distorted a very slight amount by the twisting of the rim so that there is no tendency for them to crack or break, and, since they are fully backed up by the metal at all times, they give a very long satisfactory service.

From the above description, it is believed that the construction and advantages of this device will be clear to those skilled in this art. It is also believed to be obvious that various modifications may be made without departing from the scope of the invention as defined in the following claims.

Having thus described one specific form of my invention, what I claim as new and desire to secure by Letters Patent is:

1. A clutch plate having an outer rim portion and an inner mounting portion connected together at spaced points, a hub on which said inner portion is mounted, said portions having parts overlapping at points intermediate the points where they are connected together.

2. A clutch plate having an outer rim portion and an inner mounting portion connected together at spaced points, a hub on which said inner portion is mounted, said outer portion having projections extending into the outline of said inner portion and being offset with respect to the outer edge of said inner portion by said projections intermediate said connected points.

3. A clutch plate consisting of a single sheet of metal and having an outer friction ring carrying portion and an inner mounting portion carrying said outer portion, said portions being integrally joined at spaced points and having overlapping parts intermediate said points.

4. A clutch plate having an outer rim portion and an inner mounting portion connected together at spaced points, and having parts overlapping at points intermediate the points where they are connected together, the overlapping parts on one of said portions comprising tongues cut out of the other portion and distorted to prevent their fitting into the opening from which they were cut.

5. A clutch plate having an outer rim portion and an inner mounting portion connected together at spaced points, said outer portion having projections extending into the outline of said inner portion intermediate said connected points, said projections being cut out of the inner portion.

6. A clutch plate having an unbroken outer friction ring carrying portion which portion is distorted under tension to cause the outer edge thereof to take a wavy form, said plate having an inner section carrying the outer portion and overlapping therewith at spaced points to cause distortion of the outer portion.

7. A clutch plate comprising a single sheet having an outer unbroken friction ring carrying portion, and an inner mounting portion, said outer portion being carried by a continuation of said inner portion at spaced points and having its inner edge offset with respect to the adjacent edge of the inner portion at a point intermediate said spaced points.

8. A clutch plate having an unbroken peripheral rim portion having friction rings thereon, said plate being cut along the inner edge of said rim portion to disconnect sections of the inner edge of said rim portion from the adjacent inner portions of said plate, and means holding the said sections in offset position with respect to the said inner portions.

9. A clutch plate having an unbroken peripheral rim portion having friction rings thereon, said plate being cut along the inner edge of said rim portion to disconnect sections of the inner edge of said rim portion from the adjacent inner portions of said plate, and means holding the said sections in offset position with respect to the said inner portions, said means comprising overlapping parts of said rim portion and said inner portions intermediate the ends of said sections.

10. A clutch plate having an unbroken peripheral rim portion having friction rings thereon, said plate being cut along the inner edge of said rim portion to disconnect sections of the inner edge of said rim portion from the adjacent inner portions of said plate, and means holding the said sections in offset position with respect to the said inner portions, the cuts at the ends of said sections being extended outwardly into the rim portion.

WILLIAM F. HUGHES.